Aug. 28, 1928.
J. B. HILL
1,682,562
TREATMENT OF LEAD SLUDGE
Filed March 17, 1926
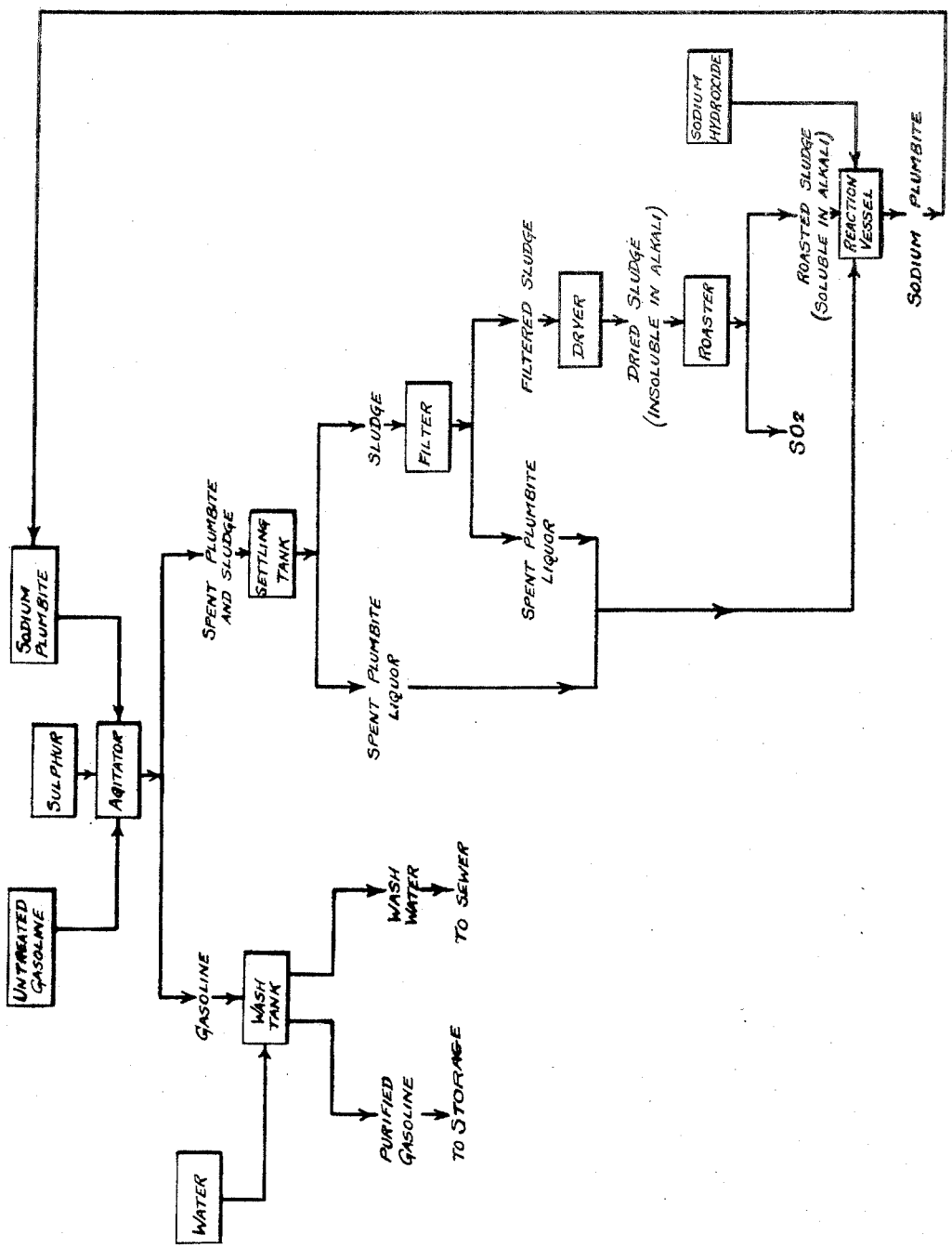
INVENTOR.
Joseph B. Hill
BY Cornelius L. Ehret
  his ATTORNEY.

Patented Aug. 28, 1928.

1,682,562

UNITED STATES PATENT OFFICE.

JOSEPH B. HILL, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

TREATMENT OF LEAD SLUDGE.

Application filed March 17, 1926. Serial No. 95,229.

My invention relates to the recovery of valuable materials from the waste products of petroleum refining.

In accordance with my invention the lead compounds contained in the sludge formed in the treatment of mineral oil distillates with an alkaline solution of a soluble plumbite are converted to a form soluble in an aqueous solution of an alkali. The alkaline solution of plumbite is, in accordance with general practice, formed by dissolving litharge or other suitable lead compound in a solution of a caustic alkali.

More particularly in accordance with my invention the sludge is dried and roasted thereby converting the major portion of the lead to oxide and sulphate in which form it is converted to plumbite by dissolving in an aqueous solution of an alkali.

Most light mineral oil distillates, such as gasoline and lamp oil, contain sulphur compounds which may impart a disagreeable odor to the oil, thereby making it unsuitable for the market. These compounds may be partially removed, or at least converted to a less objectionable form, by agitating the distillate with an alkaline solution of sodium plumbite, with or without the addition of free sulphur to complete the reaction.

By such treatment there is formed a black insoluble precipitate which settles away from the treated oil with the aqueous layer. This precipitate consists of lead sulphide together with lead salts of the mercaptans and other organic compounds of lead. The aqueous liquid containing it may be further settled and the precipitate obtained as a heavy black sludge containing water and soluble salts and generally some oil in an adsorbed or emulsified state.

It has been common practice to regard the sludge or "black strap" as a waste and to discard it. Its disposal, however, is generally difficult and expensive and leads also to the loss of the valuable lead compounds contained therein. Such practice is, therefore, economically undesirable.

I have found that if the sludge, after separation from the distillate and as completely as possible from the aqueous liquid, be dried in any convenient manner, as by exposure to the air, and the dried product thus obtained be roasted in any suitable type of apparatus, at elevated temperatures as, for example, 1000° F., substantially all of the lead compounds are converted to products, consisting largely of oxide and sulphate of lead, soluble in sodium hydroxide or equivalent alkali. Sodium plumbite, suitable for the treatment of additional quantities of distillate, may then be prepared by dissolving this conversion product in sodium hydroxide.

The accompanying drawing is a flow chart showing the application of my process to the recovery of lead from the sludge formed in treating gasoline, for example, with sodium plumbite solution. The gasoline and plumbite solution are brought into intimate contact in an agitator, preferably of the continuous type, and a reaction takes place between the sulphur compounds and the sodium plumbite which is completed by the addition of sulphur, resulting in the formation of insoluble lead compounds which, on settling, pass into the aqueous liquid.

The treated gasoline is then separated, washed with water and pumped to storage.

The aqueous liquid and sludge from the agitator above mentioned is settled further and the heavy black sludge drawn off at the bottom. If desired, steam may be blown into the liquid to effect more rapid separation.

The sludge may be filtered by any suitable filtering device leaving a filter cake which consists principally of compounds of lead with sulphur and with organic sulphur compounds, together with some sodium hydroxide, sodium plumbite and other salts. The cake may be dried by spontaneous evaporation of its moisture with air or by artificially accelerated means. The dry cake is roasted at about 1000° F. in any suitable equipment of the general character of that used in roasting ores. Here oxidation of the lead compounds occurs so that substantially all is converted to the oxide and sulphate, with formation of sulphur dioxide which escapes. When the roasting is complete the material is cooled and dissolved in an aqueous alkaline solution, preferably of sodium hydroxide, again yielding sodium plumbite. The degree of cooling may be so regulated that the heat of the roasted material may be used to raise the temperature of the alkali solution.

The spent plumbite liquors, filtered from the sludge and previously separated from the sludge in the settling tank contain substantially all of the sodium hydroxide used in making the original plumbite solution. These liquors, or either of them, may be used for reacting with the roasted sludge products, with the addition of sodium hydroxide sufficient only to replace incidental losses.

The sodium plumbite solution so produced is returned to the beginning of the process for use upon untreated gasoline or other distillate.

In this way a given quantity of litharge may be used indefinitely for treating successive quantities of distillate, thereby effecting considerable saving in the cost of treatment, for in the formed practice of discarding the sludge the lead was used only once. A small quantity of litharge may be added from time to time to make up that lost in handling.

Drying of the sludge may be preceded by washing with water to reduce the quantity of sodium hydroxide and plumbite in the residue thus permitting freer access of air to the lead compounds. The drying and roasting of the sludge may be combined into one step if desired.

For brevity in the appended claims, the term "lead sludge" refers to a sludge of the character or origin herein described.

What I claim is:

1. The method of treating lead sludge which comprises drying the sludge, subjecting it to dry heat under oxidizing conditions to cause conversion of the major portion of the lead content to compounds soluble in an aqueous solution of a caustic alkali, and dissolving the resultant lead products in an aqueous solution of the character aforesaid.

2. The method of treating lead sludge which comprises drying the sludge, roasting the dried sludge to cause conversion of the major portion of the lead compounds to lead oxide and sulfate, and dissolving these products in an aqueous solution of a caustic alkali.

JOSEPH B. HILL.